(12) United States Patent
Ivaturi

(10) Patent No.: US 6,873,603 B1
(45) Date of Patent: Mar. 29, 2005

(54) MAC ADDRESS POPULATION PROTOCOL

(75) Inventor: Devi Prasad Ivaturi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/471,902

(22) Filed: Dec. 23, 1999

(51) Int. Cl.⁷ .............................................. H04L 12/28
(52) U.S. Cl. ...................... 370/255; 370/408; 370/401; 370/466
(58) Field of Search ........................ 370/255, 400–408, 370/465, 466, 467–470; 709/223, 227, 230–232

(56) References Cited

U.S. PATENT DOCUMENTS

| | | | | |
|---|---|---|---|---|
| 5,909,550 A | * | 6/1999 | Shankar et al. | ........ 395/200.57 |
| 6,091,732 A | | 7/2000 | Alexander, Jr. et al. | |
| 6,131,117 A | * | 10/2000 | Clark et al. | ................. 709/223 |
| 6,304,575 B1 | | 10/2001 | Carroll et al. | |
| 6,377,987 B1 | | 4/2002 | Kracht | |
| 6,438,133 B1 | | 8/2002 | Ervin et al. | |
| 6,490,618 B1 | * | 12/2002 | Ferguson et al. | ........... 709/223 |
| 6,532,241 B1 | * | 3/2003 | Ferguson et al. | ........... 370/469 |

OTHER PUBLICATIONS

Perlman, Radia, Interconnections: Bridges and Routers: (1992) pp. 33–36, 100, 193–203.

Tanenbaum, Andrew, Computer Networks, Third Edition: (1996) pp. 35–38, 285–287.

Request for Comments 1795 (RFC 1795).

* cited by examiner

Primary Examiner—Alpus H. Hsu
Assistant Examiner—Toan Nguyen
(74) Attorney, Agent, or Firm—Cesari and McKenna, LLP

(57) ABSTRACT

A new search protocol uses a message which a router periodically transmits onto the local LANs connected to its ports, and in response to the new protocol, all end stations receiving the message transmit their addresses to the router. The addresses transmitted to the router comprise the addresses and any other information needed by the router to reach the end station. For example, for an Ethernet LAN the layer 2 or MAC layer address of the end station is transmitted to the router. In the event that the protocol of the LAN uses source routing, the information transmitted to the router includes both the MAC address and the Route Information Field of the end station. In any event, the router uses the information received from the end stations to build its routing table. Then, upon receipt of the next CANUREACH message from a peer router, the desired destination end station will appear in the router's routing table, and there will be no need to waste bandwidth by transmitting search messages looking for the end station. The new protocol messages are transmitted periodically in order to keep the routing tables current is as the network changes dynamically.

37 Claims, 7 Drawing Sheets

MAPP TABLE (BRIDGING TABLE) — 300

| | LIST OF ES ON LAN, AND OTHER INFORMATION — 304 | INPUT - INTERFACE — 302<br>ALL INTERFACES BRIDGED INTO ONE BROADCAST DOMAIN | CREATION TIME — 340 |
|---|---|---|---|
| 306 | FOR SRB NETWORKS ATTACHED TO AN INTERFACE<br>MAC ADDRESS - PRIORITY - RIF LIST FOR EACH ES ATTACHED TO A BRIDGE INTERFACE | | |
| 308 | TRMAC ES11-P-RIF; TRMAC ES12-P-RIF; ... TRMAC ES1N(1)-P-RIF | SRB- port1 | TM_T1 |
| 310 | TRMAC ES21-P-RIF; TRMAC ES22-P-RIF; ... TRMAC ES2N(2)-P-RIF | SRB- port2 | TM_T2 |
| | TRMAC ES31-P-RIF; TRMAC ES32-P-RIF; ... TRMAC ES3N(3)-P-RIF | SRB- port3 | TM_T3 |
| | ... | | |
| 320 | FOR ETHERNET NETWORKS ATTACHED TO A BRIDGE INTERFACE<br>MAC ADDRESS - PRIORITY | | |
| 322 | EMAC ES11-P ...; EMAC ES12-P ...; EMAC ES1N(1)-P ... | ETHERNET1 - port | TM_E1 |
| | ... etc. ... | ... etc. ... | |
| 330 | OTHER LANs IN THE BROADCAST DOMAIN CONNECTED LOCALLY TO BE BRIDGED AT A BRIDGE INTERFACE | | |
| | EMAC ES11-P; ...; EMAC ES12-P ...; EMAC ES13-P ...; EMAC ES1N(1)-P ... | FDDI1 - port | TM_X1 |
| | ... etc. ... etc. ... | | etc. |

FIG. 3

MAC ADDRESS POPULATION PROTOCOL

FIELD OF THE INVENTION

This invention relates to bridging packets in computer networks, and more particularly to establishing bridge tables while reducing network bandwidth consumed by establishing the bridge tables.

BACKGROUND OF THE INVENTION

A bridge maintains a table (the bridge table) of end stations connected to local area networks having connections to ports of the bridge. When a frame arrives at the bridge, and the frame has a Layer 2 destination address (DA) different from the Layer 2 address of the bridge, the bridge consults its bridge table, determines from the bridge table which port of the bridge to bridge the frame to in order for the frame to reach the destination end station, and transmits the frame to the LAN connected to that port.

In the event that a data frame, or a TEST frame, arrives at a bridge and the destination address of the frame does not appear in the bridge table of the bridge, then the bridge learns the source MAC address from the frame if it is not already present in its bridge table, and then floods the frame to all other ports that are bridged together.

In modern systems, using for example, the DLSw peer to peer protocol, a bridge has another option, in the event that the bridge does not find the end station. By using DLSw implementations the bridge must make a bridging decision for bridging the frame to a distant bridge. The decision is whether to drop the frame, or whether to encapsulate the frame for transmission to a peer router.

A bridge, as described above, bridges frames based upon information in the Layer 2 header of the frame. In contrast, a router routes packets based upon the Layer 3 information carried in the packet. In modern computer systems both a bridge function and a router function are built within one hardware box. The box responds to an incoming frame in order to determine whether or not the frame requires bridging or routing. In some hardware devices, a frame may be bridged by the hardware encapsulating the packet within a header and routing the encapsulated packet over, for example a TCP/IP Layer 3 protocol. A DLSw router is an example of a hardware device which bridges packets by encapsulating them within a header and routing them over a TCP/IP Layer 3 protocol.

One type of router is referred to as a "peer router", where a plurality of peer routers can reach each other through a network cloud. A DLSw router routing packets within an encapsulation is an example of a peer router. In the event that a peer router determines that a frame which it received must be routed to a corresponding peer router, the router searches for a peer router which can reach the desired destination end station. When a DLSw router receives a frame and determines that the frame must be routed to a peer DLSw router, the receiving DLSw router must determine which peer router can reach the desired destination end station. Another example of peer to peer routing is the Remote Source Route Bridged (RSRB) protocol of Cisco Systems, Inc.

DLSw routing is defined in RFC 1795 of the Internet Engineering Task Force (IETF), all disclosures of which are incorporated herein by reference, and is available at the Web Site www.IETF.org. RSRB routing is described in various documents which can be found at the Web Site www.cisco.com.

When a router provides the service of being a peer router for peer-to-peer encapsulation of a frame through a network between a source peer router to destination peer router, then the source peer router must first determine which peer router can reach the desired destination end station, as in the DLSw example above. Each peer router maintains a table (reachability table) which lists potential destination end stations along with the name of the peer router which can reach the end station. When a frame arrives at a receiving peer router and is addressed to an end station which is not connected to a LAN having a connection to a port of the receiving peer router (as determined from the bridge table and a search of local LANs), the peer router then searches for the desired destination end station in its reachability table.

For sake of clarity we distinguish three different tables maintained by a peer router: first, a bridge table (locally reachable) which the router uses to bridge using Layer 2 frame information from one of its ports to another port, and which is used when is an incoming packet has in its Layer 2 destination address (DA) an address other than the Layer 2 address of the router; second, a reachability table (remotely reachable) which the peer router uses to determine which peer router it should forward an incoming frame to as an extension of its bridging function, such as use of DLSw routing protocol for a frame having a Layer 2 destination address (DA) different from the Layer 2 address of the router; and third, a routing table which the router uses for ordinary Layer 3 routing functions and which is used when an incoming packet has as its Layer 2 destination address (DA) the Layer 2 address of the router. The first two of these tables is often thought of as the "Reachability Table", and the first part of the table lists the "Locally Reachable" end stations which are reachable through ports of the bridge, while the second part lists the "Remotely Reachable" end stations which are reachable by encapsulating the packet using DLSw protocol, and sending it to a remote DLSw peer. In some designs, the local bridging function, which uses the Locally Reachable portion of the Reachablilty Table, forwards a frame to the DLSw function, if the frame is not locally bridgeable.

If the frame is received by a remote peer from the local peer, the former consults its reachability table, if the destination address is present in its local reachability entries, it directly sends the frame to the corresponding interface; if a peer receives a TEST (explorer) frame it sends it to the remote peer as a CANUREACH frame; the remote peer floods this frame to its locally bridged ports, if the destination MAC address is not present in the remote peer's reachability table.

In the event that the peer router finds the desired destination end station in its reachability table, then the receiving router determines the address of the reachability router from its reachability table. Then the peer router encapsulates the frame and transmits it to the reachability router. Upon receipt of the frame, the reachability router de-encapsulates the frame and transmits it through its port connected to a LAN which has the desired destination end station connected thereto.

For example, in DLSw routing as defined in RFC 1795, the encapsulated frame is routed by the TCP/IP protocol from the receiving DLSw router to the reachability peer DLSw router. The reachability peer DLSw router then de-encapsulates the frame and transmits it through the port which its bridge table tells it is connected to a LAN having the desired destination end station connected thereto.

TEST Frame and CANUREACH Message

In the event that the peer router which received a TEST frame from an end station looks in its reachability table for the desired destination end station and cannot find it listed, the router enters a protocol to find a reachability router. The protocol starts with the receiving router transmitting a CANUREACH message, as defined in RFC 1795, to all of its peer routers.

Upon receipt of the CANUREACH message, each of the peer routers checks its bridge table for the desired destination end station. In the event that a peer router finds the desired destination end station listed in its bridge table, it transmits an ICANREACH message to the receiving router, and upon receipt of the ICANREACH message the receiving router updates its reachability table. The receiving router is now ready to encapsulate the next data frame addressed to the desired destination end station, and send it to the reachability router.

In the alternative event that a peer router receiving the CANUREACH message does not find the desired destination end station in its bridge table, then the peer router floods the TEST frame onto its locally bridged LANs. This test frame looks exactly the same as the TEST frame received by the receiving router which transmitted the CANUREACH message. If the peer router receives a reply from the intended destination end station from one of its locally bridged LANs, the peer router updates its bridge table with the address of the intended destination end station and replies to the receiving peer router with an ICANREACH frame. The receiving router then receives the ICANREACH message and updates its reachability table. Again, the receiving router is now ready to encapsulate the next data frame addressed to the desired destination end station, and send it to the reachability router.

Operational Example

Bridges connect sets of disparate LANs (Ethernet, IEEE 802.5 token ring, FDDI, etc) by Layer 2 bridging. Under everyday engineering practice, there are a number of different types of bridges in everyday use. For example, a source route bridge (SRB) connects token ring and fddi like LANs wherein source bridging is used. Similarly, transparent bridges (TB) connect Ethernet, token ring, fddi, etc. LANs. Also, source route translational bridges (SR/TLB) bridge between transparent and source route bridging domains.

Search messages are used by stations to locate desired receiving stations. These search messages have different names depending upon the technology of the various LANs connected to ports of the router. Neighbor greeting by use of protocols such as Layer 2 LLC TEST and Layer 3 ARP are described by Radia Perlman in her book *Interconnections*, published by Addison Wesley in 1992, all disclosures of which are incorporated herein by reference, particularly Chapter 2 pages 33–34, and Chapter 3 pages 193–203.

All bridges maintain a table of source addresses (Layer2-MAC) (locally reachable), and this table is populated by a learning process. This table is a Layer 2 level table, and is referred to as the bridge table (locally reachable bridge table), as described hereinabove. When a bridge receives a packet the bridge table is updated with the source MAC and the LAN port on which the packet is received. In the case of SRB, the additional route information field (RIF) information is added to the bridge table entry.

A system of bridged LANs is, however, geographically local, i.e., they are confined to a building or a campus as the bridged system appears as a single LAN. In order to bridge LANs which are geographically separated, Remote Source Route Bridging (RSRB) and Data-Link Switching (DLSw) techniques have been developed.

RSRB deals with source route bridging of two or more remotely connected LANs, and DLSw of RFC 1795 facilitates bridging of remotely connected LANs using TCP/IP to transport packets across IP clouds. DLSw is capable of doing TB, SRB, SR/TLB, etc.

As an example of operation of bridges and DLSw interconnection of geographically separated bridged LANs, consider the following two topologies.

Topology 1
(station A)—LAN1—-TB bridge—-LAN2—(stations B)
Topology 2
(stations A)—LAN1—DLSw router—-IP cloud—DLSw router—-LAN2—(stations B)
Stations A: One or more stations on LAN 1. Stations B: One or more stations on LAN2.

In Topology 1 LAN1 and LAN2 are locally connected.

In topology 2 LAN 1, and LAN2 are remotely connected across an IP cloud by DLSw. So LAN1 can be in California and LAN2 in Boston.

Next we examine the situation where A wants to talk to B.

In topology 1, A sends a test frame (an explorer) to station B, the TB bridge receives it, and learns the (MAC) address of A. The TB bridge verifies its bridge table to find out if the address of B (MAC of B) is associated with any of its ports; if it finds the address of B associated with the same port as it received the packet from, it drops the packet since B is also on the same LAN as A. If the TB bridge finds the address of B associated with any other port that is being bridged with the port that is connected to A, it sends that packet out on that port. If the TB bridge does not find address of B at all, it floods an explorer packet onto all other ports (LANs), except for the port on which the packet is received on. Any configurable bridge, such as bridges of present day engineering design, may have many ports connected to different networks, but only a subset of those may be configured as bridged together.

One of these explorer packets will be sent on LAN2 which will reach B, and B replies. As the reply reaches the TB bridge, the TB bridge will learn the address of B (MAC address of B) and update its bridge table for the port connected to LAN2. The destination address in the reply will be the MAC address of A, which the bridge finds in the bridge table as associated with the port connected to LAN1.

The bridge table entries are not permanent, and they are timed out by a timer in the bridge. These entries will be learned again if there is traffic from the stations on different LANs connected to different ports of the bridge. This time out and re-learning mechanism helps to correctly represent the topological development in the whole system of bridges and LANs. For example, station A or B could have moved to some other LAN, or some other port of a bridge, or may have been completely removed from their respective LANs, or, for example, the station itself may have died and be no longer functional.

Now, in topology 2, the mechanism for A to talk to B is essentially the same as in topology 1, with the additional function of the DLSw router flooding the explorer packets onto all of its DLSw peer routers. That is, in the bridging function, DLSw router1 floods the explorer packet it received to any other ports that are bridged to the input port of the explorer, with the additional function that the DLSw module also floods the explorer packet onto all of the DLSw links to peer DLSw routers. Also, to A all of the DLSw operations appear in Layer 2, even though the DLSw router uses Layer 3 to bridge packets using TCP/IP over an Internet cloud.

The DLSw module is, under standard engineering practice, a software routine which supplies the DLSw functionality. The DLSw module maintains a table of its own, called the "reachability cache", by learning the MAC address of A as locally reachable. The DLSw reachability cache can be viewed as two caches, one locally reachable such as given by the bridge table, the other remotely reachable such as is given by the "reachability table" mentioned hereinabove. In some engineering design, the bridge software module maintains the bridge table, while the DLSw software module maintains a similar "locally reachable cache", even these two tables are substantially the same. In engineering designs where two separate tables are maintained, there must be a synchronization mechanism implemented so that updates in one of the tables is immediately transferred to the other table. In alternative engineering designs, the Layer 2 bridge software module and the Layer 3 DLSw software module share the same bridge table. The DLSw module then verifies its reachability cache table entries for the MAC address of B. If the MAC address of B is found as locally reachable, the DLSw router1 drops the explorer, since the bridging function (in this case TB) takes care of dealing with that explorer. If the DLSw router1 finds the MAC address of B as remotely reachable through its peer DLSw router2, then DLSw router1 sends a response back to the originator A as if B has responded. Else, it transports the explorer to its peer (CANUREACH message), DLSw router2, over the TCP/IP connection that the two peers have established.

DLSw router2, upon receiving the explorer, updates its Leachability cache with the MAC address of A as remotely reachable through its peer DLSw router1. DLSw router2 then verifies its reachability cache for the MAC address of B. If DLSw router 2 finds the MAC address of B, it sends a response back to DLSw router1 that it can reach B (ICANREACH message). DLSw router1, now, updates its reachability cache with B's MAC address as remotely reachable through its peer DLSw router2, and in turn replies to A as if B has responded to A's explorer.

However, if DLSw router2 does not find B's MAC address in its reachability cache, it sends explorers to all the ports (LANS, in effect) the DLSw function is being bridged together with. An explorer goes onto LAN2, reaches B, and B replies. DLSw router2 now updates its reachability cache (locally reachable cache, or bridge table) with B's MAC address as locally reachable, and sends an ICANREACH message to its peer DLSw router1. DLSw routerr then updates its reachability cache (remotely reachable), and responds to A's explorer for B by replying to A.

Excessive TEST Frame Flooding

It is important to note that each of these DLSw routers may have multiple local LANs bridged together, and may be peering with multiple DLSw routers. So an explorer sent by A could potentially be flooded onto multiple LANs, all of which are connected to DLSw router1's peers, in addition to flooding the IP networks (often low bandwidth serial lines) that DLSw router1 is peering across. This situation becomes progressively worse when many stations on LAN 1 try to talk to different stations, including those stations on LAN2, and on other LANs.

Typically, only a few (perhaps only one) peer routers will be connected to a LAN having the desired destination end station connected thereto. There may be several hundred peer routers which receive the CANUREACH message, and each of them will transmit their local LAN search messages through each port. The result is that a large amount of network bandwidth is consumed by the various search messages.

It is desirable to operate a peer-to-peer routing protocol while consuming a minimum of network bandwidth from transmission of search messages searching for end stations which do not appear in a bridge table of a router.

SUMMARY OF THE INVENTION

The invention reduces the consumption of network bandwidth by transmission of search messages by routers. The invention is a new search protocol using a message which a router periodically transmits onto the local LANs connected to its ports, and in response to the new protocol, all end stations receiving the message transmit their addresses to the router. The addresses transmitted to the router comprise the addresses and any other information needed by the router to reach the end station. For example, for an Ethernet LAN the layer 2 or MAC layer address of the end station is transmitted to the router. In the event that the protocol of the LAN uses source routing, the information transmitted to the router includes both the MAC address of the end station and the Route Information Field needed to reach the end station. In any event, the router uses the information received from the end stations to build its bridge table. Then, upon receipt of the next CANUREACH message from a peer router, the desired destination end station will appear in the router's bridge table, and there will be no need to waste bandwidth by transmitting search messages looking for the end station. The new protocol messages are transmitted periodically in order to keep the bridge tables current as the network changes dynamically.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 3 is a block diagram of a MAPP Table in accordance with the invention

DETAILED DESCRIPTION OF AN ILLUSTRATIVE EMBODIMENT

Figure 1:
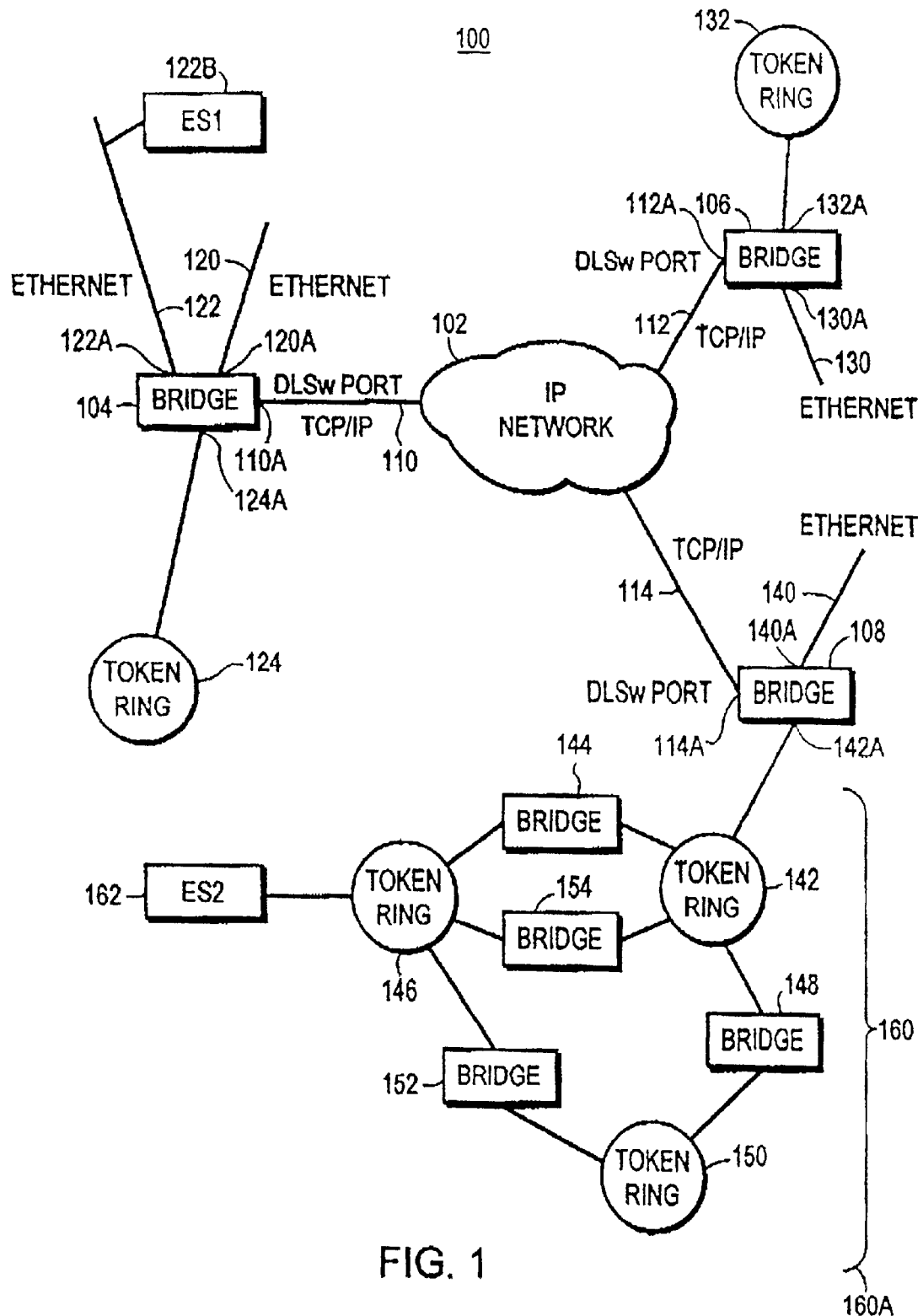
FIG. 1 is block diagram of a computer network.

Turning now to FIG. 1, computer network 100 is shown. Network Cloud 102 supports TCP/IP protocol communication between stations connected thereto. Bridge 104, bridge 106, and bridge 108 provide Layer 2 bridging between Local Area Networks (LANs) connected to ports of the respective bridges. Bridges 104, 106, 108 have ports providing TCP/IP protocol communication through network cloud 102, and these bridges have their TCP/IP ports connected to network cloud 102. The DLSw ports of bridges 104, 106, 108 are operated by a routing function in bridges 104, 106, 108. For example, bridge 104 has it's TCP/IP port 110A connected by link 110 to Network cloud 102, bridge 106 has its TCP/IP port 112A connected to network cloud 102 by link 112, and bridge 108 is connected at its DSLw port 114A by link 114 to network cloud 102. Communication using TCP/IP protocol through a DLSw connection, can be established between bridges 104, 106, 108 through network cloud 102. Also communication using TCP/IP protocol through a DLSw connection can be established by any one of bridges 104, 106, 108 with any other bridges (not shown) connected to Network Cloud 102. For example, there may be as many as several hundred such bridges, and as a further example, there may be several thousand such bridges connected to Network Cloud 102, and all communicate with each other through Network Cloud 102, by TCP/IP protocol through a DLSw connection.

Bridge 104 is also connected to Ethernet local area network (LAN) 120 at its port 120A, and to Ethernet LAN 122 at its port 122A, and bridge 102 is also connected at its port 124A, to IEEE Token Ring Network 124. Bridges 104, 106, 108 normally bridge packets at the layer 2 level, however the bridge functions may be incorporated as elements of a Router. A Router normally operates at Layer 3 level of communications protocol, however, many modern day Routers include a bridging function.

Bridge 106 is illustrated as connected at its port 112A to a DLSw function internal to the bridge, and externally port 112A connects to link 112 as a TCP/IP connection to IP network cloud 102. Also, bridge 106, at its port 132A connects to token ring 132. Bridge 106 also connects at its port 130A to Ethernet LAN 130. In bridging packets between Ethernet LAN 130 and IEEE 802.5 token ring 132 bridge 106 serves as a source route translational bridge, SR/TLB.

Bridge 108 connects at port 142A to token ring 142. Bridge 108 also connects to Ethernet LAN 140. Bridge 108 has a DLSw port 114A which connects through link 114 to IP network cloud 102. Token ring 142 connects to bridge 144 and thence to token ring 146. Also, token ring 142 connects through bridge 148 to token ring 150. Bridge 152 links between token ring 146 and token ring 150. Further, bridge 154 links between token ring 146 and token ring 142.

Region 160, indicated by bracket 160A, is a source routing region. Source routing region 160 comprises an IEEE 802.5 token ring 142, and token ring 146, and token ring 150. The IEEE 802.5 token rings 142, 146, 150 are linked in a complex network arrangement by source routing bridges 144, 148, 152, and 154.

Bridge 108 serves as a SR/TLB, that is a source routing translating bridge, in bridging packets from source routing region 160 to Ethernet LAN 140 through port 140A, or in bridging packets in the reverse direction from Ethernet LAN 140 to an end station in source routing region 160.

Suppose that end station ES1 112B transmits a frame containing the MAC address of end station ES2 162 connected to token ring 146. The frame is transmitted by end station ES1 112B onto Ethernet LAN 122. Bridge 104 must encapsulate the frame for DLSw routing to bridge 108. At bridge 108 the frame is de-encapsulated by DLSw reception, and transmitted onto token ring 142. From token ring 142, the frame must be routed by source routing to end station ES2 162. Bridge 108 performs the source routing, by having stored in its bridge table a route to end station ES2 162. For example, the route specified in the frame transmitted onto token ring 142 may specify that the frame passes through bridge 144 to token ring 146, where it is received by end station ES2 162. Alternatively, bridge 108 could use a different route to end station ES2 162, for example, the route could be specified as a transfer from token ring 142 through bridge 154 to token ring 146, and then to end station ES2 162. As a further alternative, the frame could have the route specified by bridge 108 as travelling onto token ring 142, through bridge 148, to token ring 150, thence to bridge 152, and finally to token ring 146 where the frame is received by end station ES2 162.

In summary, Bridge 108 populates the route information field (RIF) of the frame from its bridge table, and the route then specifies the path through source routing region 160.

Figure 2:
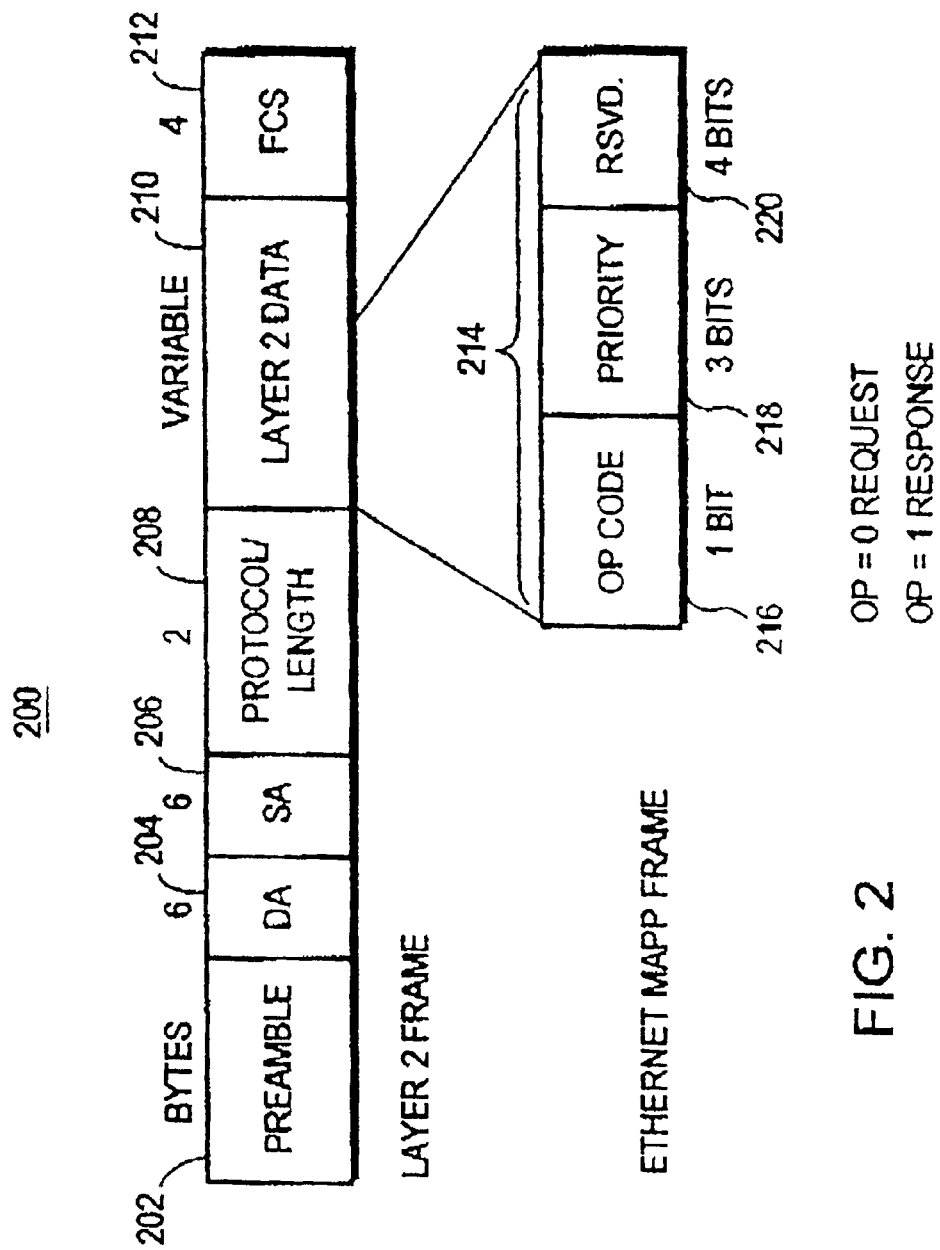
FIG. 2 is a block diagram of fields of a data frame.

Turning now to FIG. 2, a layer 2 Ethernet frame 200 in accordance with the invention is shown. Ethernet frame fields are shown and described by Radia Perlman in her book *Interconnections*, published by Addison Wesley, Copyright 1992, all disclosures of which are incorporated herein by reference, especially at page 34–36. Field 202 contains the preamble. Field 204 contains the MAC destination address DA, and is 6 bytes in length. Field 206 contains the MAC source address, and is 6 bytes in length.

The function of Field 208 depends upon whether the frame 200 follows the older Classical Ethernet protocol, or whether frame 200 follows the IEEE 802.3 protocol. In either case, field 208 is 2 bytes in length. Under the older Classical Ethernet protocol field 208 is the protocol identifier. Under IEEE 802.3 protocol field 208 is a length indicator field. The differences between Classical Ethernet protocol and IEEE 802.3 Ethernet protocol are explained by Radia Perlman in her book *Interconnections* at page 36.

Field 210 is the data field, and is between 46 and 1,500 bytes in length. Field 212 is the frame check sequence (FCS) field, and is 4 bytes in length.

In accordance with the invention, a unique value is assigned to protocol/length field 208 for a MAPP frame. MAPP is an acronym which stands for MAC Address Population Protocol, and is an acronym which refers to the present invention. Details of the MAPP process will now be described.

The unique value of the protocol identifier in field 208 informs a receiving station that the frame is a MAPP frame. Only the first byte 214 of data field 210 is used in the present illustrative embodiment of the invention, and this first byte is followed by 45 bytes of "byte stuffing" so that the Ethernet frame meets the minimum length requirement of 46 bytes for data field 210. Byte 214 is broken into three fields: field 216 is a one (1) bit operational code (OP code); field 218 is a three (3) bit priority value; and the remaining field 220 is a four (4) bit reserved field. The OP code in field 216 has two values, the bit="0", or clear, identifies the frame as a MAPP Request Frame. The OP code in field 216 with the bit="1", or set, identifies the frame as a MAPP Response Frame.

Figure 4:
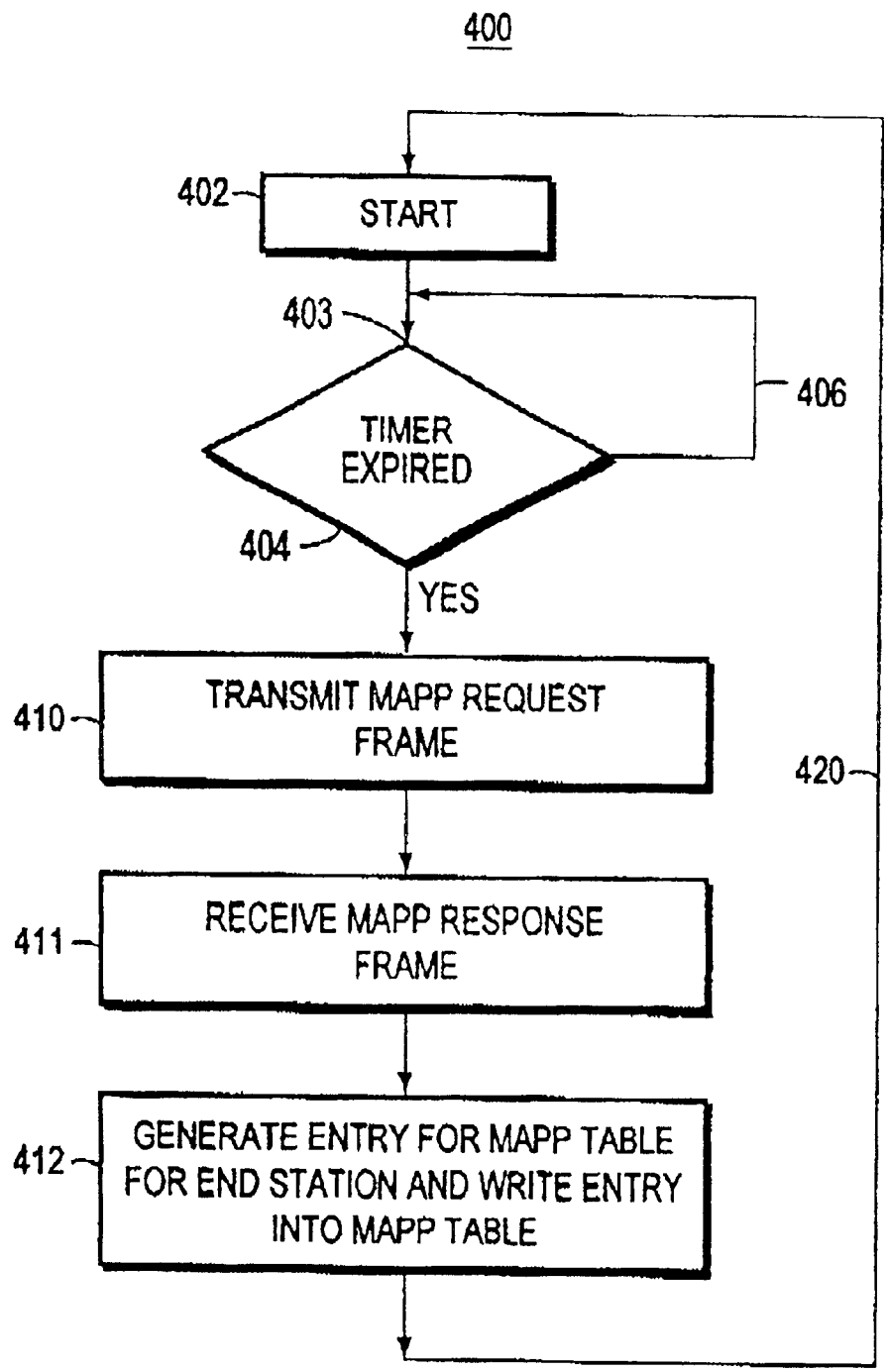
FIG. 4 is a flow chart of MAPP Request transmission process.

In operation, the MAPP process executes under the control of a timer in a bridge such as bridges 104, 106, 108 having a connection to a network cloud such as network cloud 102. The timer causes a bridge 104, 106, 108 to transmit a MAPP Request Frame (OP code="0", or clear) onto all of the local LANs connected to port interfaces of the bridge. A flow chart for the timer is shown in FIG. 4, and will be discussed in connection with that Figure. The MAPP Request Frame uses a broadcast destination address (DA), where the broadcast destination address, in hex, is all "f". The broadcast address is "ff ff ff ff ff ff", that is six bytes of "ff".

When a bridge receives a MAPP Request frame transmitted by another bridge, the receiving bridge has a choice as to the proper response. For example, the receiving bridge may simply ignore the MAPP Request frame, and by so doing each bridge builds its own MAPP table. Alternatively, for example, a receiving bridge may bridge (that is forward) the MAPP Request frame onto all LANs which are bridged with the originating LAN, and by this embodiment each bridge uses the MAPP Request frames of another bridge to rebuild its MAPP table. However, forwarding MAPP Request frames has a disadvantage that as each bridge times out its MAPP table entries, MAPP Request frames flood all LANs which are bridged together, and such flooding may use excessive amounts of network bandwidth.

The DLSw function in a bridge receiving a MAPP Request frame ignores the MAPP frame. That is, the DLSw function takes no action in response to the bridge receiving the MAPP frame. However, later when a CANUREACH message arrives over the TCP/IP link to the DLSw function, the DLSw function makes use of the MAPP table whose entries were built up by MAPP Response frames received in response to the MAPP Request frame.

The MAPP Request Frame is received by all end stations connected to each LAN. Each end station recognizes the MAPP Request Frame by recognizing the unique value in protocol field 208, and by reading OP code field 216. In response, each end station then generates a Response Frame with the OP code bit="1", set, and having as its destination address the MAC address of the bridge. The MAC address of the bridge may be read from the SA field 206 of the MAPP Request Frame.

The bridge receives a MAPP Response frame from each end station which responds to the broadcast MAPP Request Frame. The bridge then uses these MAPP Response frames to build a MAPP Table, as shown in FIG. 3. MAPP Table 300 is a "bridge table" of stations which can be reached by the router through its ports, as described hereinabove. All end stations listed in the MAPP Table 300 can be reached by bridging an incoming packet from an incoming port to an outgoing port. MAPP Table 300 has an entry, as shown in column 302, for each input interface, that is for each port of the bridge (or router). Each entry for an interface refers to a list of end stations which can be reached through that interface, or port, by bridging. Column 304 contains entries for each interface, where the entries are the list of end stations which can be reached through that interface. The end stations are identified by their MAC addresses.

For example, section 306 of MAPP Table 300 contains entries for interfaces connecting to IEEE 802.5 token ring LANs. Each row in section 306, such as row 308, is a list of end stations identified by their MAC addresses. The MAC addresses are referred to as "TRMAC" to indicate that they are on a token ring "TR". For example, row 308 has a first end station entry TRMAC ES11-P-RIF. In this entry TRMAC ES11 stands for the MAC address of end station ES11. The designation ES11 stands for port 1 (first 1 in ES11) and end station 1 (second 1). P stands for a priority value. RIF stands for the Rout Information Field needed for a source routed bridged (SRB) network such as a bridged IEEE 802.5 token ring network. The RIF gives the route from end station ES11 to the bridge. The second end station entry in row 308 is "TRMAC ES12-P-RIF", where again TRMAC is the MAC address, ES12 stands for end station connected to port 1, and is end station number 2; P is a priority value; and RIF is the RIF value for the SRB network, for the path between end station ES12 and the bridge. The following entries in row 308 are for end station 3 on the LAN connected to port 1, ES13, its P value, and its RIF, etc. Row 308 has a list of entries through end station ES1N(1), that is through N(1), where there are N(1) end stations connected to port 1. Row 310 has a list of end station entries for all end stations connected to port 2 of the bridge. Finally, there is a row in section 306 of MAPP Table 300 for each port of the bridge connected to an IEEE 802.5 SRB token ring network.

Section 320 has a row for each Ethernet LAN connected to a port of the bridge. For example, only one row is illustrated, row 322. The first entry in row 322 for an end station is "EMAC ES11-P". EMAC is the Ethernet MAC address of the end station. The end station is identified as ES11, that is Ethernet port 1 (the first 1) and end station number 1 connected to that port (the second 1). P is a priority value. The second entry is "EMAC ES12-P", representing Ethernet MAC address EMAC for end station ES12, the second end station connected to Ethernet port 1, etc. The "P" value is a three bit priority number.

Section 330 of MAPP Table 300 has a row for each port of the bridge connected to any other type of LAN. For example a port may be connected to a FDDI token ring LAN. Often FDDI LANs are bridged together using SRB, hence the entries will have a RIF in them. Alternatively, either IEEE 802.5 token ring or FDDI LANs may be bridged by Transparent Bridging (TB), and in this case neither will have a RIF. Further, another port may be connected to a simulated LAN, etc. In each case, column 304 of MAPP Table 100 contains a list of all end stations which respond to the MAPP Request Frame, as illustrated with reference to FIG. 2.

All of the entries of MAPP Table 300 may be built from MAPP Response frames received in response to the bridge transmitting a MAPP Request Frame onto all LANs connected locally to the bridge, with the MAPP Request Frame constructed with a broadcast address. All end stations receive the broadcast MAPP Request Frame, and all respond with a MAPP Response frame. The MAPP Response frame is used to build the list of end stations connected to each port of the bridge, through the LAN connected to that port.

Accordingly, MAPP Table 300 contains an entry for each of the end stations which can be reached on local LANs by the bridge, and which end stations respond to the MAPP protocol.

For example, some end stations on a LAN may not respond to the MAPP protocol. For a MAPP table to contain the entry of an end station, the end station needs to have the ability to understand the MAPP protocol. That is, the end station must be able to recognize the protocol type field as MAPP protocol. End stations that do not understand MAPP protocol, will simply drop the MAPP request frames.

Column 340 gives the time at which the entries for a LAN connected to a particular port of the bridge were established. As mentioned above, the MAPP Request Frames are transmitted periodically, under the control of a timer. A different timer may be configured for each port of the bridge, with the designated time interval chosen in response to observations of the rapidity with which the topology of the particular LAN changes. At any rate, the time entry in column 340 gives the time of establishing the entry of the particular row for the particular LAN connected to the particular port of the bridge. Any attempt to use an entry after the expiration time for that port can trigger the transmission of a MAPP Request frame in order to rebuild the entries for that particular LAN. Alternatively, the expiration of an entry in MAPP Table 300 may be monitored by a process within the bridge, and the MAPP Request Frame transmitted upon detection by the monitoring process that the entries for that LAN have expired. Latency in response to requests for information from MAPP Table 300 may be minimized by transmitting the next MAPP Request Frame on the basis of monitoring the time of establishment of the entries, rather than waiting for a request to come in for use of the entries, with a subsequent long waiting period for the entries to be rebuilt if the entries have expired. The actual time value entered into MAPP Table 300 in column 340, that is the "creation time"

is normally the time at which a MAPP response frame was received by the bridge.

Turning now to FIG. 4, a flow chart for process 400 for operation of a MAPP Request timer for a particular port of a bridge, for example bridge 104, 106, 108, etc. is shown. The timer process starts at START block 402, and the process then goes to entry point 403 of decision block 404. At decision block 404 it is determined whether or not the timer has expired. In the event that the timer has not expired, decision block 404 answers NO, and the process returns along path 406 to entry point 403 of decision block 404. In the event that the timer has expired, then decision block 404 answers YES and the process goes to block 410. At block 410 the bridge transmits a MAPP Request Frame onto the LAN connected to the particular port of the bridge. After transmission of the MAPP Request Frame, the process 400 goes to block 411. At block 411 a MAPP Response Frame is received from an end station. After receipt of the MAPP Response Frame, process 400 goes to block 412. At block 412 process 400 generates a time of creation entry for column 340 of MAPP Table 300, for the particular port and its associated LAN. In an exemplary embodiment of the invention, the "time of creation" of the entry is taken as the time that the MAPP Request frame was transmitted. In an alternative embodiment of the invention, the "time of creation" is taken as the time at which the MAPP Response Frame was received. The complete entry for that end station is then written into MAPP Table 300. After the entry is written into MAPP Table 300, process 400 returns along path 420 to START block 402. At START block 402, process 400 starts again, so that MAPP Request Frames are periodically transmitted onto the LAN associated with the port of the bridge 104, 106, 108, etc.

Each end station, at a time when it is ready after receiving the MAPP Request frame, transmits its MAPP Response frame. The bridge then receives the MAPP Response frames as they arrive at the bridge. Upon receiving a MAPP response frame, the bridge reads the necessary information from fields of the MAPP Response frame and writes entries into its MAPP Table 300.

An alternative procedure in a bridge is to simply record in an entry in column 340 the time that a MAPP Request Frame is transmitted for a LAN, and upon an attempt to use the entries for that LAN, to determine whether or not the entries are expired. In the event that the entries are not expired, then simply use the entries. In the event that the entries are expired, then transmit a MAPP Request Frame, delete the entries, and build new entries as MAPP Response frames are received in response to the MAPP Request Frame.

An advantage of periodically transmitting a MAPP Request Frame is that the entries will not be expired when there is an attempt to use the entries. A disadvantage in periodically transmitting a MAPP Request Frame, is in the event that no requests are received requiring use of MAPP Table 300, bandwidth on the LANs connected to the bridge will still be used by MAP Request Frames and MAPP response frames.

An advantage to a bridge only transmitting a MAPP Request Frame in response to discovering, by a request to use the MAPP Table, that the entries for a particular LAN are expired, is that bandwidth is not used for MAPP Request and MAPP Response frames when it is not needed. A disadvantage to a bridge in waiting for a request to use the MAPP Table to discover that the entries are expired, is that a long latency will be required for answering the request as it will be necessary to wait until the MAPP Table entries are rebuilt in response to the bridge receiving MAPP Response frames from the various end stations connected to local LANs of the bridge.

A time chart showing operation of the system is shown in the following MAPP TIME CHART. The MAPP Time Chart is based upon the model that the entries in MAPP Table 300 are refreshed periodically in accordance with the Flow Chart of FIG. 4, so that a bridge, upon receipt of a CANUREACH message does not have to flood its local LANs with a MAPP Request Frame.

Mapp Time Chart

Time Action
T1 ES1 transmits a TEST frame to ES2 in order to establish a layer 2 link.
T2 Frame is received by bridge DLSw1.
T3 The bridge looks at its bridge table and does not find the DA MAC. The bridge floods a TEST frame to any locally bridged ports, and also passes this frame to the DLSw function.
T4 Bridge checks its Remotely Reachable Cache, and does not find the DA MAC.
T5 Bridge transmits a CANUREACH message by multicast to its peer bridges (or peer routers, the boxes may have both bridge and router functionality, along with DLSw functionality).
T6 Any peer bridge having a MAPP Table entry for end station ES2, indexed by MAC address, transmits an ICANREACH unicast message to DLSw1.
T7 Bridge DLSw1 receives the ICANREACH message and updates its Remotely Reachable Table.

Figure 5:
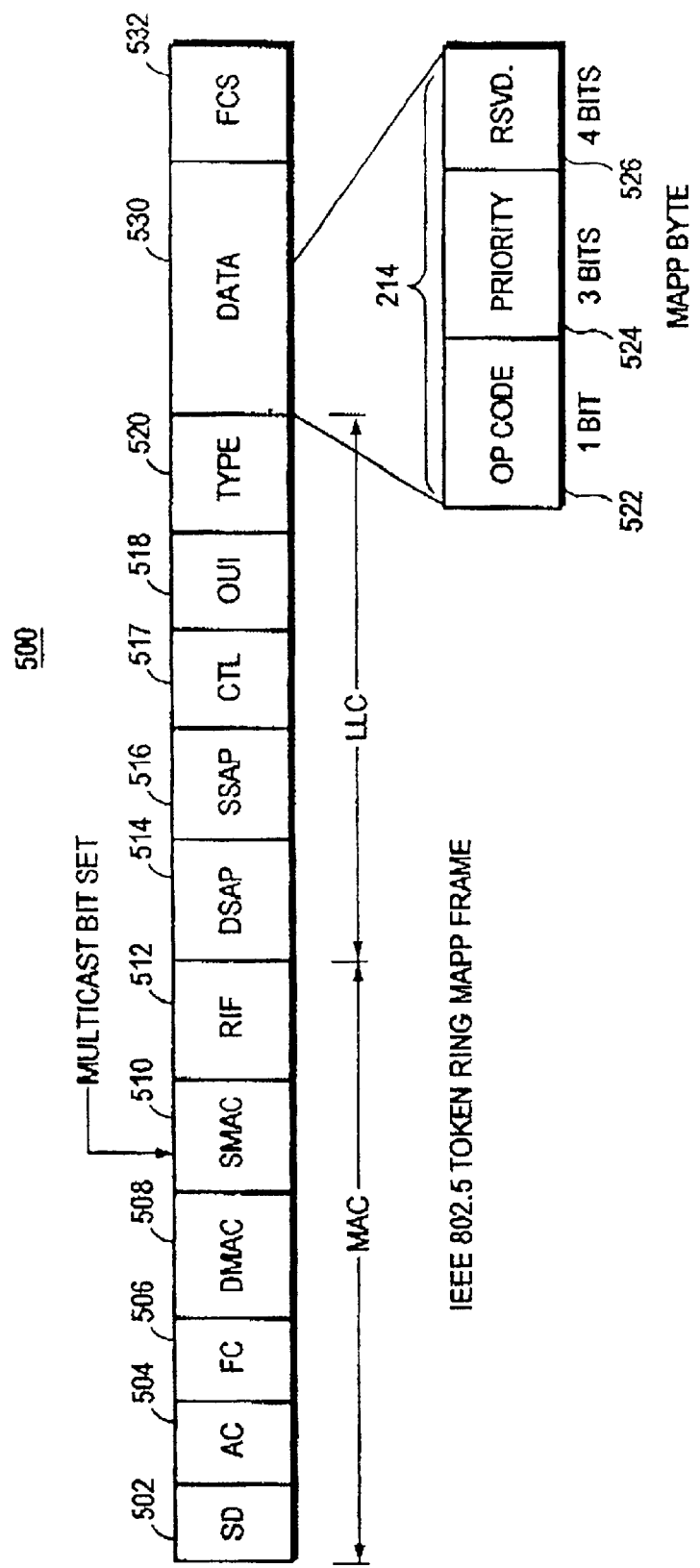
FIG. 5 is a block diagram of fields of a data frame.

Turning now to FIG. 5, frame 500 is suitable for implementing the invention on an IEEE 802.5 token ring network. The format of an IEEE 802.5 frame is set out at section 3.12 of the IEEE 802.5 Standard. Field 502 SD is the starting delimiter, and is one byte. Field 504 AC is the access control, and is one byte. Field 506 FC is the frame control field and is one byte. Field 508 DMAC is the destination MAC address, and is six bytes. Field 510 SMAC is the source MAC address and is six bytes. The Multicast Bit of field 510, SMAC, is set to indicate to a receiving machine that the frame is an IEEE 802.5 token ring frame, as described by Radia Perlman in her book *Interconnections* at page 100. Field 512 RIF is the Routing Information field and is 0 to 30 bytes.

The LLC sublayer fields of IEEE 802.5 frame 500 follow. Field 514 DSAP and field 516 SSAP implement the SNAP SAP option. Field 514 DSAP is one byte and contains binary "10101010". Field 516 DSAP is one byte and also contains binary "10101010". Field 517 is a Control Field (CTL) and contains the value "03". Field 518 OUI is the organizationally unique identifier and is assigned by a standards body to identify a manufacturer. Field 520 TYPE is two bytes and is a type assigned by the manufacturer identified by the OUI field. In implementing the invention, the manufacturer assigns a unique type value to field 520 TYPE to indicate to a receiving computer that the frame is a MAPP frame. Data field 530 contains the Layer 2 data. FCS field 532 is the frame check sequence. MAPP byte 214 is the first byte in data field 530.

For example, the particular combination of DSAP, SSAP and Control fields shown in FIG. 5 is used to support layer 3 protocols such as IP, IPX, etc.

Whether the MAPP frame 500 is a Request or Response MAPP frame is determined by the value of OP code in field 522 of MAPP byte 214. MAPP byte 214 is labeled with reference numeral 214 because it is identical in meaning to MAPP byte 214 shown in FIG. 2 with reference to the Ethernet MAPP frame 200. Op code field 522 is one bit, as described above in reference to FIG. 2. When OP code 522 bit is ="0" then MAPP frame 500 is a MAPP Request frame. When OP code 522 bit="1" then MAPP frame 500 is a MAPP Response frame. Field 524 is a three bit priority field. Field 526 is four bits of reserved field.

In operation, the process of FIG. 4 transmits an IEEE 802.5 MAPP frame 500 at block 410 onto each IEEE 802.5 token ring network. The IEEE 802.5 token ring network may be a SRB network with many rings connected by bridges. The RIF of field 512 gives the route through the various rings and bridges of the SRB network. The entries in RIF field 512 are built up as the MAPP Request frame travels to the target end station. The MAPP Response frame then uses the RIF read from the MAPP Request frame as a directed message frame to the inquiring bridge. Entries 306 of MAPP Table 300 are filled in by the bridge as MAPP response frames are received from the various end stations on the SRB network.

Figure 6:
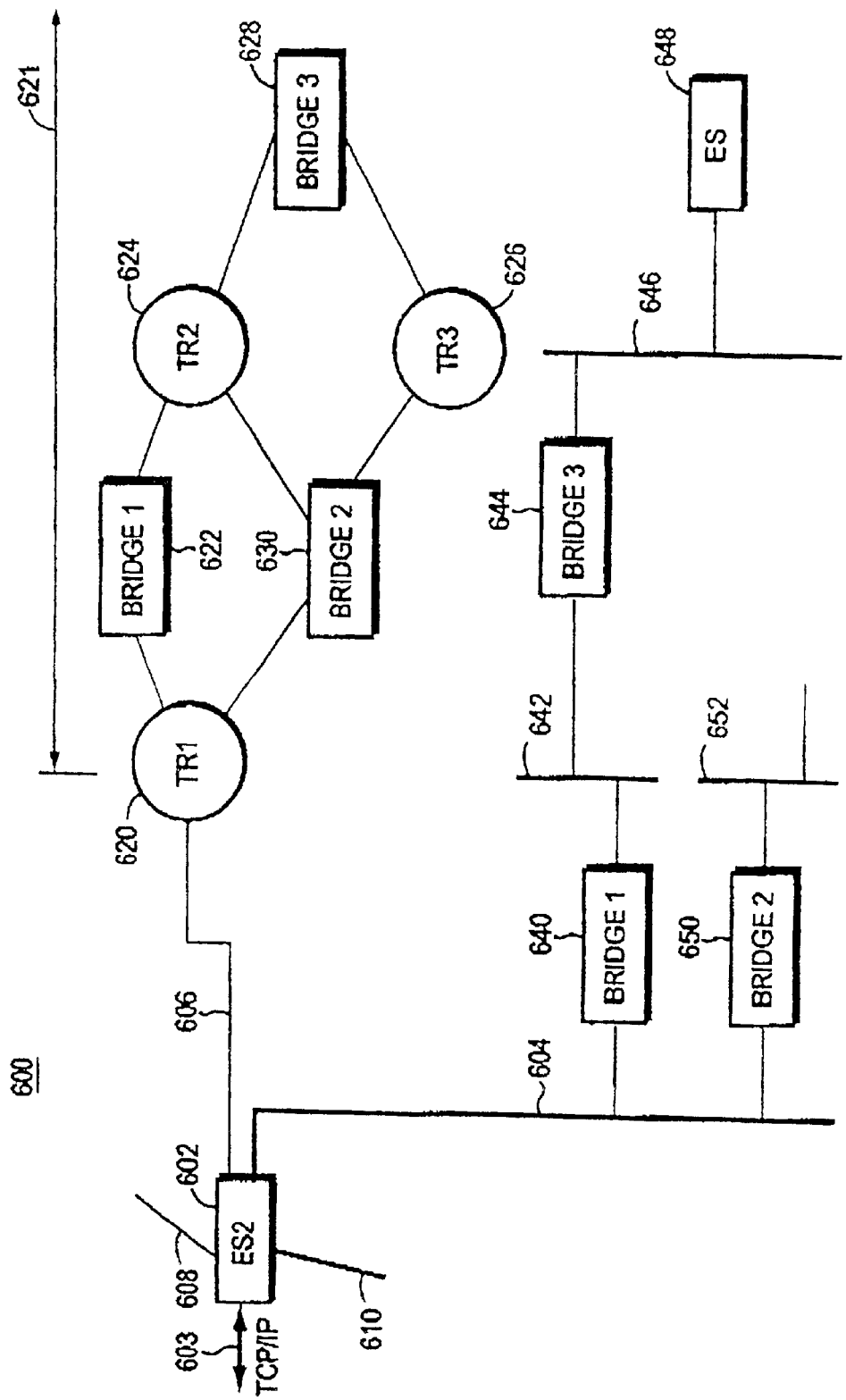
FIG. 6 is a block diagram of a network of LANs connected to a router.

Turning now to FIG. 6, exemplary details of exemplary LANs connected to DLSw bridge 602 are shown. TCP/IP connection 603 connects DLSw bridge 602 to an IP wide area network, that is to an IP network cloud such as IP Network cloud 102 shown in FIG. 1. Connection 606 connects DLSw bridge 602 to an SRB token ring network by connection to token ring LAN 620. Token ring LAN 620 connects by bridge 622 to token ring LAN 624, and by bridge 630 to token ring LAN 626. Bridge 628 connects to both token ring LAN 624 and token ring LAN 626. Bridge 630 connects to three token rings, token ring LAN 620, token ring LAN 624, and to token ring LAN 626. Routing paths through the SRB network 621 are established by ordinary IEEE 802.5 methods. MAPP Request and MAPP Response frames use the RIF algorithms in ordinary use for SRB networks such as network 621.

DLSw bridge 602 also connects to Ethernet LAN (for example IEEE 802.3 Ethernet) 604. Ethernet LAN 604 connects to bridge 640, and bridge 604 connects to Ethernet LAN 642. Ethernet LAN 642 connects to bridge 644, and bridge 644 connects to Ethernet LAN 646. End station ES 648 connects to Ethernet LAN 648. Also, Ethernet LAN 604 connects to bridge 650, which in turn connects to Ethernet LAN 652. A frame travelling from DLSw bridge 602 to end station ES 648, or in the reverse direction, travels by ordinary transparent routing. MAPP Request and MAPP Response frames travel between DLSw bridge 602 and end station ES 648 by ordinary transparent routing.

The MAPP Table of DLSw bridge 602 is built by DLSN bridge 602 periodically transmitting MAPP Request frames onto all LANs bridged together by DLSw bridge 602, such as, for example, Ethernet LAN 610, source route bridging region 621, and Ethernet LAN region reached through Ethernet LAN 604.

Although the invention has been described with specific reference to DLSw peer-to-peer routing, as set out in RFC 1795, the invention may be equally useful when used in connection with any other routing system wherein a bridge (or router) has a need of a is bridging table which lists all end stations which can be reached by transmitting a frame through an interface of the bridge (or router). For example, the invention is of benefit in the RSRB protocol mentioned hereinabove.

Figure 7:
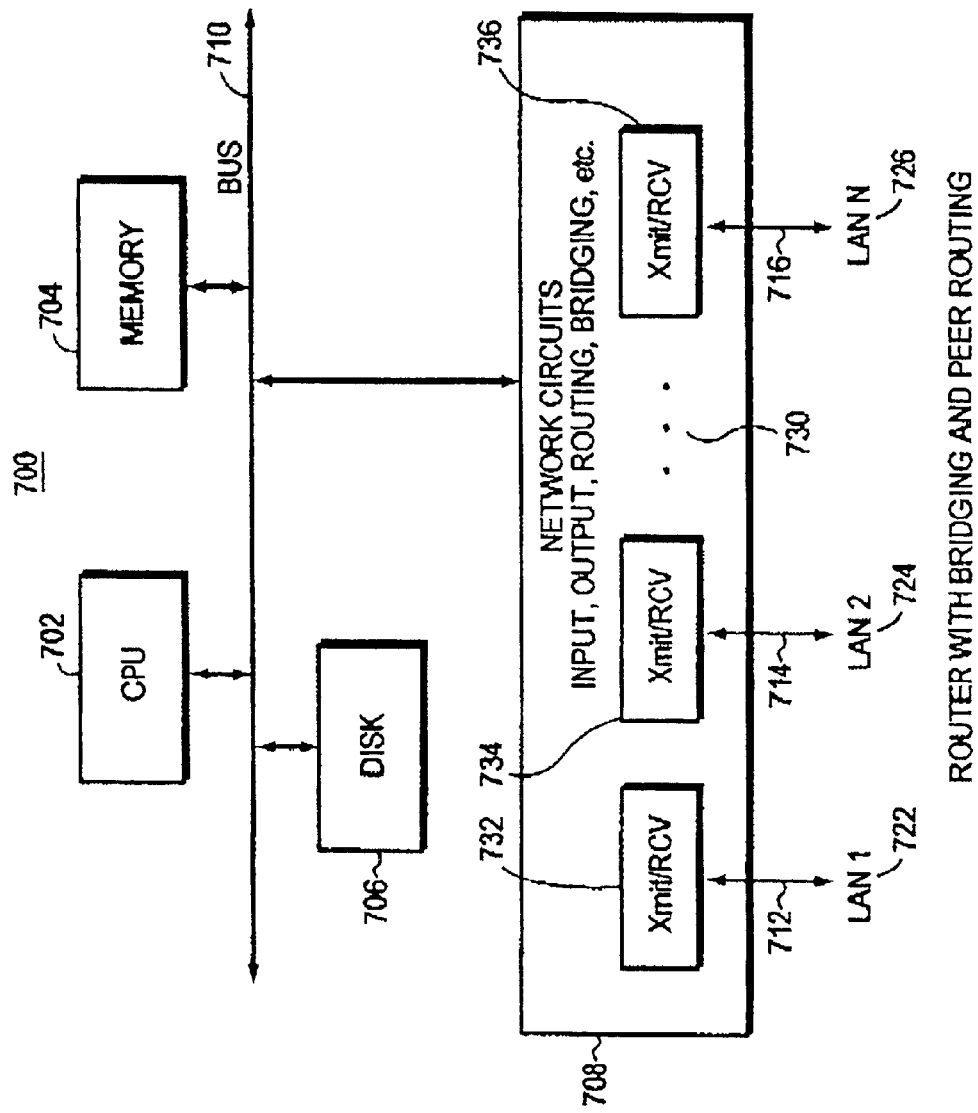
FIG. 7 is a block diagram of a router.

Turning now to FIG. 7, a block diagram of a typical bridge or router 700 is shown. Central processor unit (CPU) 702 manages operation of the router. Memory 704 holds data structures, data, and instructions useful to operation of bridge or router 700. Memory 704 may be any type of electronic memory, Random Access Memory (RAM), Read Only Memory (ROM), etc. Disk 706 is an internal disk drive to facilitate operation of router 700. Disk 706 is optional, and many designs of routers do not use an internal disk drive 706.

For example, the various tables used by bridge or router 700 may be stored on disk 706. That is, the three tables: first, the locally reachable bridge table which the bridge (or router) uses to bridge using Layer 2 frame information from one of its ports to another port, and which is used when an incoming packet has in its Layer 2 destination address an address other than the Layer 2 address of the router; second, a remotely reachable table which the peer router uses to determine which peer router it should forward an incoming frame to as an extension of its bridging function, such as use of DLSw routing protocol for a frame having a Layer 2 destination address different from the Layer 2 address of the router; and third, a routing table which the router uses for ordinary Layer 3 routing functions and which is used when an incoming packet has as its Layer 2 destination address the Layer 2 address of the router, may all be stored on disk 706. Alternatively, the tables may be maintained in memory 704 in the event that no disk drive is used in the router. In any event, the tables will be in memory 704 for use by the various bridging and routing functions of router 700.

Disk 706 may represent a hard disk drive mounted in the case of router 700. Alternatively, disk 706 may represent a floppy disk drive mounted in the case of router 700. As a further alternative, disk 706 may represent both a hard disk drive and a floppy disk drive, and in this event, instructions to execute the functions of router as described herein may be transferred from the floppy disk to the hard disk. The instructions will then be read from the hard disk to memory 704 before they are executed to perform the functions of router 700. When disk 706 is a floppy drive, instructions may be transferred from a floppy disk read by disk drive 706 into memory 704. The instructions written to the floppy disk drive, and transferred to memory 704 then provide the instructions to execute the functions described herein of router 700.

Network circuit 708 contains the major bridging and routing circuits of router 700. Bus 710 connects the CPU 702, Memory 704, Disk (if any) 706, and network circuits 708 together so that they can exchange information by use of typical bus protocols.

Network circuit 708 contains the circuits responsible for input from local area networks (LANs), output to LANs, circuits for bridging of data packets, and circuits for performing routing, and possibly memory circuits to facilitate fast switching, etc. Switching is a general term used for fast transfer of packets from an input LAN to an output LAN. Particularly, bridging of packets using only Layer 2 constructs, is accomplished by network circuit 708. Each port 712, 714, 716 of router 700 connects to a different local area network (LAN). For example, port 712 connects to a LAN designated as LAN1 722. Port 714 connects to LAN2 724. There may be a large number of ports, and the highest numbered port is represented as port N 716, where LAN N 726 is shown connected to port N 716. The three dots 730 indicate that network circuits 708 may serve many router ports. Each port is connected to its transmitter and receiver. As an example, one or more of the ports 712, 716, etc. may connect the router to a TCP/IP network cloud for switching using a peer to peer protocol such as DLSw protocol, or for example RSRB protocol, etc.

Transmitter and receiver circuit Xmit/RCV 732 serves port 712 and LAN 1 722. Xmit/RCV circuit 734 serves port 714 and LAN 2 724. There is a transmit and receive circuit for each LAN, and so correspondingly Xmit/RCV circuit 736 serves port N 716 and LAN N 726.

The layers of the Internet Protocol communications model are implemented in various convenient hardware elements as shown in the block diagram of a router of FIG. 7. The Internet Communications model is described by Andrew Tanenbaum in his book *Computer Networks, Third Edition* published by Prentice Hall publishing company Copyright 1996, all disclosures of which are incorporated herein by reference, especially at pages 35–38. For example, depending upon the design of the router, Layer 1 and Layer 2 may be implemented in hardware in the circuits of network circuits 708. Alternatively, field parsing and recognition functions may be implemented in software which executes on CPU 702 in connection with memory 704. Higher layer functions such as Layer 3 Network, or Layer 4 Transport, may be implemented in software executing on CPU 702. Layer 4 reliable transport implemented in the transport layer is usually implemented in software executing in CPU 702, although even Layer 4 functions may be implemented in hardware by using an ASIC semiconductor chip. The MAPP Table 300 shown in FIG. 3 may be stored in memory 704 of router 700. Alternatively, MAPP Table 300 may be implemented a semiconductor chip located in network circuits 708 so that it may be accessed more quickly than possible with a read command to memory 704.

Instructions are stored in memory 704 for execution in CPU 702. The various functions described as operating in router 700 may be accomplished by execution of instructions read from memory 704 and executed in CPU 702.

Router or bridge 700 may alternatively, be referred to as a bridge with a DLSw Layer 3 port, or as a further alternative router or bridge 700 may be referred to as a "switch". The acronym "DLSw" stands for Data Link Switch. The term "switch" often refers to internal operation of the hardware. A switch may operate in either Layer 2 or in Layer 3. Alternatively, in hardware having both bridge functionality and router functionality such as a bridge with a DLSw port, the bridge module may function internally as a hardware switch, and also the router module may function internally as a hardware switch. Operations requiring both bridge module and router module operation, such as for example, maintaining synchronization between a Layer 2 bridge table and a DLSw Layer 3 local reachability cache, may use function calls between the different modules. And the internal forwarding structure may be a switch, and both bridge and router modules execute in CPU 702. A switched LAN is described by Andrew Tanenbaum in his book *Computer Networks, Third Edition*, published by Prentice Hall, Copyright date 1996, all disclosures of which are incorporated herein by reference, particularly pages 285–287.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method of bridging a frame in a computer network, comprising:

selecting by a bridge, a local area network (LAN) and a protocol for communication on said LAN, said LAN selected from a plurality of LANs connected to said bridge, said selecting producing a selected LAN and a selected protocol, transmitting by said bridge a MAC address population protocol (MAPP) request message onto said selected LAN using said selected protocol;

receiving, in response to an end station receiving said MAPP request message, a MAPP response message from said end station, and receiving a plurality of response messages, at least one response message received from each end station receiving said MAPP request message and capable of responding thereto, each response message of said plurality of response messages containing address information concerning a specific end station transmitting said each response message; and, updating a MAPP table entry by said bridge in response to receiving said response message from each said specific end station.

2. The method as in claim 1 further comprising:

using updated entries in said MAPP table to route a frame received by said bridge to a second bridge, said entries having a list of end stations which can be reached by transmitting a frame onto a LAN connected to an interface of said bridge.

3. The method as in claim 1 further comprising: expiring said MAPP table entry after passage of an expiration time interval.

4. The method as in claim 3 further comprising: transmitting said MAPP request frame periodically by said bridge so said MAPP table entry is updated periodically.

5. The method as in claim 1 further comprising:

assigning a unique value to a layer 2 field of a frame to indicate that said frame is a MAPP frame; and, carrying MAPP data in a first byte of a layer 2 data field.

6. A method of routing a frame in a computer network, comprising:

selecting, by a router, a local area network (LAN) and a protocol for communication on said LAN, said LAN selected from a plurality of LANs connected to said router, said selecting producing a selected LAN and a selected protocol;

transmitting by a first peer-to-peer router a MAC address population protocol (MAPP) request message onto said selected LAN using said selected protocol;

receiving by said first peer-to-peer router, in response to an end station receiving said MAPP request message, a MAPP response message from said end station, and receiving a plurality of response messages, at least one response message received from each end station receiving said MAPP request message and capable of responding thereto, each response message of said plurality of response messages containing address information concerning a specific end station transmitting said each response message;

updating a MAPP table entry by said router in response to receiving said response message from each said specific end station;

transmitting said MAPP request frame periodically by said first peer-to-peer router so said MAPP table entry is updated periodically and data of the entry does not expire;

receiving by said first peer-to-peer router a CANUREACH message from a second peer-to-peer router asking whether said first peer-to-peer router is connected to a local LAN having a designated end station connected thereto;

determining from said MAPP table by said first peer-to-peer router whether or not said designated end station is connected to a local LAN connected to said first peer-to-peer router.

7. A bridge for a computer network, comprising:
a processor to select a local area network (LAN) and a protocol for communication on said LAN, said LAN selected from a plurality of LANs connected to said bridge to produce a selected LAN and a selected protocol;
a transmitter to transmit a MAC address population protocol (MAPP) request message onto said selected LAN using said selected protocol;
a receiver to receive, in response to an end station receiving said MAPP request message, a MAPP response message from said end station, and receiving a plurality of response messages, at least one response message received from each end station receiving said MAPP request message and capable of responding thereto, each response message of said plurality of response messages containing address information concerning a specific end station transmitting said each response message; and,
a processor to update a MAPP table entry in response to said bridge receiving said response message from each said specific end station.

8. The apparatus as in claim 7 further comprising: said processor using updated entries in said MAPP table to route a frame received by said bridge to a second bridge, said entries having a list of end stations which can be reached by transmitting a frame onto a LAN connected to an interface of said bridge.

9. The apparatus as in claim 7 further comprising: said processor expiring said MAPP table entry after passage of an expiration time interval.

10. The apparatus as in claim 7 further comprising: said transmitter transmitting said MAPP request frame periodically by said bridge so said MAPP table entry is updated periodically.

11. The apparatus as in claim 7 further comprising:
said processor assigning a unique value to a layer 2 field of a frame to indicate that said frame is a MAPP frame, and carrying MAPP data in a first byte of a layer 2 data field; and,
said transmitter transmitting said MAPP frame onto a LAN connected to a port of said bridge.

12. A bridge, comprising:
a processor to select a local area network (LAN) and a protocol for communication on said LAN, said LAN selected from a plurality of LANs connected to said bridge to produce a selected LAN and a selected protocol;
a transmitter in a first peer-to-peer router to transmit a MAC address population protocol (MAPP) request message onto said selected LAN using said selected protocol;
a receiver in said first peer to peer router to receive, in response to an end station receiving said MAPP request message, a MAPP response message from said end station, and receiving a plurality of response messages, at least one response message received from each end station receiving said MAPP request message and capable of responding thereto, each response message of said plurality of response messages containing address information concerning a specific end station transmitting said each response message;
a processor in said peer to peer router to update a MAPP table entry by said router in response to receiving said response message from each said specific end station;
a timer to transmit said MAPP request frame periodically by said first peer-to-peer router so said MAPP table entry is updated periodically and data of the entry does not expire;
a receiver in said first peer-to-peer router to receive a CANUREACH message from a second peer-to-peer router asking whether said first peer-to-peer router is connected to a local LAN having a designated end station connected thereto;
a processor to determine from said MAPP table in said first peer-to-peer router whether or not said designated end station is connected to a local LAN connected to said first peer-to-peer router.

13. A bridge for use in a computer network, comprising:
means for selecting a local area network (LAN) and a protocol for communication on said LAN, said LAN selected from a plurality of LANs connected to said bridge to produce a selected LAN and a selected protocol;
means for transmitting by said bridge a MAC address population protocol (MAPP) request message onto said selected LAN using said selected protocol;
means for receiving, in response to an end station receiving said MAPP request message, a MAPP response message from said end station, and receiving a plurality of response messages, at least one response message received from each end station receiving said MAPP request message and capable of responding thereto, each response message of said plurality of response messages containing address information concerning a specific end station transmitting said each response message; and,
means for updating a MAPP table entry by said bridge in response to receiving said response message from each said specific end station.

14. A method of bridging a frame in a computer network, comprising:
selecting, by a bridge, a local area network (LAN) and a protocol for communication on said LAN, said LAN selected from a plurality of LANs connected to said bridge, said selecting producing a selected LAN and a selected protocol;
transmitting by said bridge a MAC address population protocol MAPP request message onto said selected LAN using said selected protocol, a MAPP request message transmitted periodically by said bridge;
receiving, in response to an end station receiving said MAPP request message, a MAPP response message from said end station, said response message containing address information concerning said end station transmitting said MAPP response message;
updating a MAPP table entry by said bridge in response to receiving said response message from said end station; and
receiving said MAPP table entries from a plurality of additional end stations receiving said MAPP request message in order for said bridge to update its bridge table periodically in response to said periodic transmission of said MAPP request message.

15. A method of routing a frame by a router, comprising:
selecting by said router a local area network (LAN) and a protocol for communication on said LAN, said LAN selected from a plurality of LANs connected to said router, said selecting producing a selected LAN and a selected protocol;

transmitting by said router a MAC address population protocol (MAPP) request message onto said selected LAN using said selected protocol;

receiving by said router, in response to receipt of said MAPP request message by a computer, a MAPP response message containing address information concerning an end station; and updating a MAPP table entry by said router in response to receiving said response message.

16. The method as in claim 15 further comprising:

in said receiving step said computer is said end station.

17. The method as in claim 15 further comprising:

in said receiving step said computer is said computer is a second router.

18. The method as in claim 15 further comprising:

using updated entries in said MAPP table to route a frame received by said router to a second router, said entries having a list of end stations which can be reached by transmitting a frame onto a LAN of said plurality of LANs.

19. The method as in claim 15 further comprising:

expiring said MAPP table entry after passage of an expiration time interval.

20. The method as in claim 15 further comprising:

transmitting said MAPP request frame periodically by said router so said MAPP table entry is updated periodically.

21. The method as in claim 15 further comprising:

assigning a unique value to a layer 2 field of a frame to indicate that said frame is a MAPP frame; and, carrying MAPP data in a first byte of a layer 2 data field.

22. Electromagnetic signals propagated through a computer network, comprising:

said electromagnetic signals carrying instructions for execution on a processor to accomplish the method of claim 1 or claim 6 or claim 14 or claim 15.

23. Computer readable media comprising:

said computer readable media containing instructions for execution on a computer to accomplish the method of claim 1 or claim 6 or claim 14 or claim 15.

24. A router, comprising:

means for selecting by said router a local area network (LAN) and a protocol for communication on said LAN, said LAN selected from a plurality of LANs connected to said router, said selecting producing a selected LAN and a selected protocol;

means for transmitting by said router a MAC address population protocol (MAPP) request message onto said selected LAN using said selected protocol;

means for receiving by said router, in response to receipt of said MAPP request message by a computer, a MAPP response message containing address information concerning an end station; and means for updating a MAPP table entry by said router in response to receiving said response message.

25. The router as in claim 24 further comprising:

said computer is said end station.

26. The router as in claim 24 further comprising:

said computer is a second router.

27. The router as in claim 24 further comprising:

means for using updated entries in said MAPP table to route a frame received by said router to a second router, said entries having a list of end stations which can be reached by transmitting a frame onto a LAN of said plurality of LANs.

28. The router as in claim 24 further comprising:

means for expiring said MAPP table entry after passage of an expiration time interval.

29. The router as in claim 24 further comprising:

means for transmitting said MAPP request frame periodically by said router so said MAPP table entry is updated periodically.

30. The router as in claim 24 further comprising:

means for assigning a unique value to a layer 2 field of a frame to indicate that said frame is a MAPP frame; and, means for carrying MAPP data in a first byte of a layer 2 data field.

31. A router, comprising:

a processor to select a local area network (LAN) and a protocol for communication on said LAN, said LAN selected from a plurality of LANs connected to said router, said selecting producing a selected LAN and a selected protocol;

a transmitter to transmit a MAC address population protocol (MAPP) request message onto said selected LAN using said selected protocol;

a receiver to receive, in response to receipt of said MAPP request message by a computer, a MAPP response message containing address information concerning an end station; and a MAPP table updated by said processor in response to receiving said response message.

32. The router as in claim 31 further comprising:

said computer is said end station.

33. The router as in claim 31 further comprising:

said computer is a second router.

34. The router as in claim 31 further comprising:

updated entries in said MAPP table to route a frame received by said router to a second router, said entries having a list of end stations which can be reached by transmitting a frame onto a LAN of said plurality of LANs.

35. The router as in claim 31 further comprising:

an expiration time interval to expire said MAPP table entry after passage of said expiration time interval.

36. The router as in claim 31 further comprising:

a timer to transmit said MAPP request frame periodically so said MAPP table entry is updated periodically.

37. The router as in claim 31 further comprising:

a layer 2 field of a frame having a unique value to indicate that said frame is a MAPP frame; and, a first byte of a layer 2 data field to carry MAPP data.

* * * * *